UNITED STATES PATENT OFFICE.

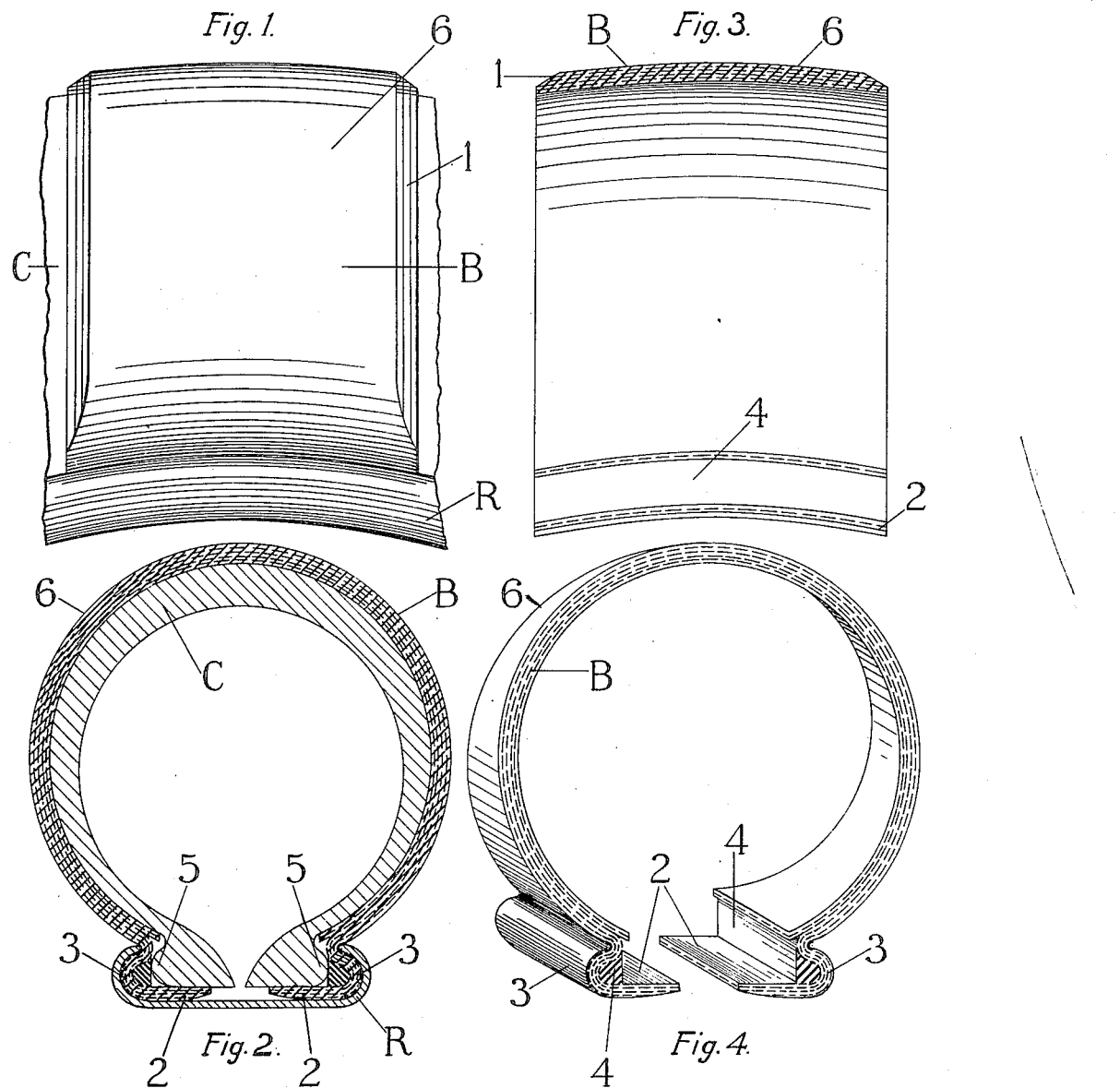

OLIVER C. THOMLEY, OF OSSEO, WISCONSIN.

TIRE BOOT.

1,402,808.  Specification of Letters Patent.  Patented Jan. 10, 1922.

Application filed June 6, 1921. Serial No. 475,380.

*To all whom it may concern:*

Be it known that I, OLIVER C. THOMLEY, a citizen of the United States, residing at Osseo, in the county of Trempealeau and State of Wisconsin, have invened certain new and useful Improvements in Tire Boots, of which the following is a specification, reference being had to the accompanying drawings.

This invention relates to certain improvements in tire boots and it is an object of the invention to provide a novel and improved device of this general character which can be readily and conveniently applied in working position upon a tire and in a manner to prevent water, dust and the like from working in between the boot and tire.

Another object of the invention is to provide a novel and improved boot of this general character which snugly or closely fits a tire either of a smooth or non-skid type, and wherein the boot is maintained in applied position without the necessity of lacing, sewing or the like.

The invention consists in the details of construction and in the combination and arrangement of the several parts of my improved tire boot whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in side elevation illustrating a boot constructed in accordance with an embodiment of my invention in applied position, Figure 2 is a transverse sectional view taken through the structure illustrated in Figure 1, Figure 3 is a longitudinal sectional view taken through my improved boot as herein disclosed detached, and Figure 4 is a view in perspective of my improved boot as herein set forth.

My improved boot as herein disclosed comprises a body portion B consisting of a plurality of superimposed vulcanized laminations. The end or free marginal portions 1 of the body B are beveled as particularly illustrated in Figures 1 and 3 so that the boot when applied will offer no undue hindrance or obstruction to the travel of the wheel carrying the boot.

My improved boot is adapted to be applied externally of the carcass C of a tire structure and the outer laminations of the body B are extended to provide the inwardly directed flaps 2 adapted to underly the carcass C when the boot is in applied position and as particularly illustrated in Figure 2. The flaps 2 have their outer end portions arcuate in cross section, as at 3, with the concave faces thereof inwardly directed. Fitted within the pocket formed by the arcuate portion 3 of each of the flaps 2 is a filler 4 of rubber which contacts, when the boot is applied, with a bead 5 of the carcass C.

The filler 4 also results in the arcuate portion 3 of each of the flaps 2 constituting a bead which is adapted to be engaged in a conventional manner with a clincher R.

The outer lamination 6 of the body B is preferably of rubber, while the remaining laminations are of the fabric now generally employed in the building of tires.

My improved boot can be employed with equal facility in connection with a smooth tire or a tire of non-skid type, and when in applied position my improved boot has close contact or fit upon the carcass C whereby water, dust and the like is prevented from working in between the applied boot and tire.

In applying my improved boot, it is not necessary that the carcass C be entirely removed from the rim, it is only necessary that the tire be deflated and under which conditions the boot may be easily mounted as required as the bead portions of the carcass C may be sufficiently flexed to permit the desired application of the boot or more particularly the flaps. When the tire is again inflated, the applied boot is effectively maintained in position and the structure of my improved boot and particularly as pertains to the fillers 4, substantially eliminate the possibility of a rim cut.

My improved boot is particularly advantageous for use in view of the fact that no lacing or sewing is required, and the necessity is avoided of using rivets or hooks which would otherwise have a tendency to pull out or unduly wear the boot.

From the foregoing description it is thought to be obvious that a tire boot constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. As a new article of manufacture, a tire boot comprising a body, the ends of the body being provided with inwardly directed flaps, each of said flaps being connected with the body by an arcuate portion to provide a bead, and a filler of bodily compressible material arranged within the arcuate portion of each of the flaps.

2. As a new article of manufacture, a tire boot comprising a body consisting of a plurality of superimposed vulcanized laminations, the outer laminations being extended to provide inwardly directed flaps, the portions of the flaps adjacent the boot being arcuate in cross section with the concave faces thereof inwardly directed, and a filler of bodily compressible material fitting within the pocket formed by the arcuate portion of each of the flaps.

In testimony whereof I hereunto affix my signature.

OLIVER C. THOMLEY.